US009553433B2

(12) United States Patent
Lalancette

(10) Patent No.: US 9,553,433 B2
(45) Date of Patent: Jan. 24, 2017

(54) SNAP-IN GANGABLE ELECTRICAL BOX

(71) Applicant: Thomas & Betts International LLC, Wilmington, DE (US)

(72) Inventor: Daniel Lalancette, St-Jean-sur Richelieu (CA)

(73) Assignee: Thomas & Betts International LLC, Wilmington, DE (US)

( * ) Notice: Subject to any disclaimer, the term of this patent is extended or adjusted under 35 U.S.C. 154(b) by 0 days.

(21) Appl. No.: 14/676,951

(22) Filed: Apr. 2, 2015

(65) Prior Publication Data

US 2015/0311686 A1 Oct. 29, 2015

Related U.S. Application Data

(60) Provisional application No. 61/985,725, filed on Apr. 29, 2014.

(51) Int. Cl.
*H02G 3/08* (2006.01)

(52) U.S. Cl.
CPC ................ *H02G 3/086* (2013.01); *H02G 3/08* (2013.01)

(58) Field of Classification Search
CPC .......... H02G 3/08; H02G 3/081; H02G 3/086; H02G 3/121; H02G 3/123; H02G 3/126
USPC ................. 174/50, 520, 535, 559, 560, 561, 562,174/563, 53, 54, 58, 61; 220/3.92, 3.94, 4.01, 220/4.02, 4.26
See application file for complete search history.

(56) References Cited

U.S. PATENT DOCUMENTS 1,456,385 A * 5/1923 Kvarnstrom ........... H02G 3/086 220/3.92
1,483,453 A * 2/1924 Knoderer ............... H02G 3/086 217/12 R
2,552,400 A * 5/1951 Brunia ................... H02G 3/081 220/3.94
4,176,759 A * 12/1979 Nattel .................... H02G 3/126 220/3.94
4,428,492 A * 1/1984 Jorgensen .............. H02G 3/086 174/53
5,011,033 A * 4/1991 Roth ...................... H02G 3/126 220/3.8
5,574,255 A * 11/1996 Simmons ............... H02G 3/121 174/53
5,594,207 A 1/1997 Fabian et al.
5,619,013 A 4/1997 Jorgensen
5,703,327 A 12/1997 Jorgensen
5,874,692 A 2/1999 Simmons
(Continued)

FOREIGN PATENT DOCUMENTS

CA 2 059 378 A1 8/1992
CA 2 136 121 C 6/1995
(Continued)

*Primary Examiner* — Dimary Lopez Cruz
(74) *Attorney, Agent, or Firm* — Hoffmann & Baron, LLP

(57) ABSTRACT

A gangable electrical box includes a U-shaped box member having a generally rectangular back wall including opposed back wall ends. An end wall extends from each of the back wall ends. Each of the end walls has opposed longitudinal edges. The gangable box further includes a pair of generally rectangular side walls where each side wall has opposed side wall ends. The side wall ends are attachable to the U-shaped box member to define an open ended box interior. The longitudinal edges of the end walls and the opposite ends of the side walls include interfitting snap fit connection for toolless attachment of the side walls to the box member.

6 Claims, 5 Drawing Sheets

(56) References Cited

U.S. PATENT DOCUMENTS

| | | | |
|---|---|---|---|
| 6,057,509 | A | 5/2000 | Simmons |
| 6,229,087 | B1 | 5/2001 | Archer |
| 6,710,245 | B2 | 3/2004 | Roesch et al. |
| 6,812,405 | B1 | 11/2004 | Hull et al. |
| 6,870,101 | B1 | 3/2005 | Hull et al. |
| 6,872,884 | B2 | 3/2005 | Roesch et al. |
| 6,903,272 | B2 | 6/2005 | Dinh |
| 6,940,017 | B2 | 9/2005 | Roesch et al. |
| D523,818 | S | 6/2006 | Roesch et al. |
| 7,112,743 | B2 | 9/2006 | Hull et al. |
| D533,139 | S | 12/2006 | Roesch et al. |
| 7,368,661 | B2 | 5/2008 | Lalancette et al. |
| 7,576,284 | B2 | 8/2009 | Dinh |
| 7,757,875 | B2 | 7/2010 | Lalancette et al. |
| 2006/0076348 | A1 | 4/2006 | Michaud |

FOREIGN PATENT DOCUMENTS

| | | | |
|---|---|---|---|
| CA | 2 482 219 | C | 5/2005 |
| CA | 2 521 976 | A1 | 4/2006 |
| CA | 2 708 453 | C | 1/2012 |

* cited by examiner

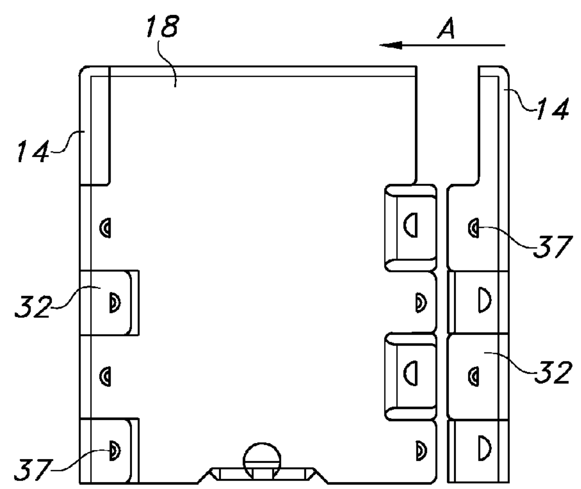
FIG. 7
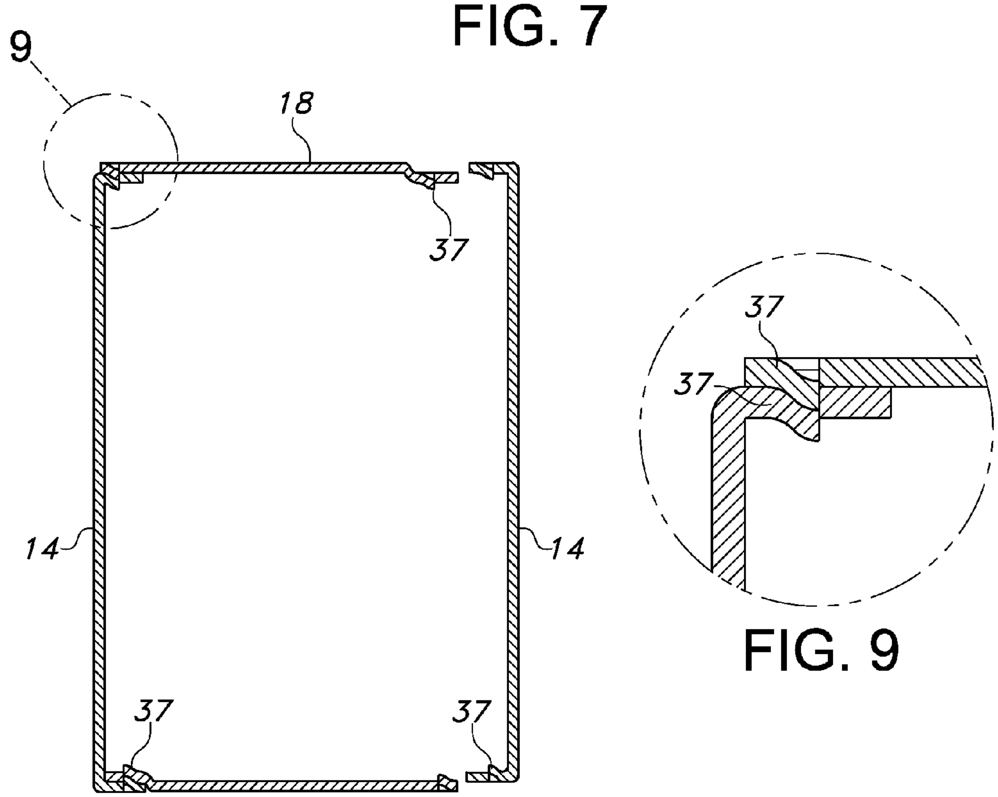
FIG. 8
FIG. 9

SNAP-IN GANGABLE ELECTRICAL BOX

CROSS REFERENCE TO RELATED APPLICATIONS

This application claims priority to U.S. Provisional Patent Application No. 61/985,725 filed on Apr. 29, 2014, the contents of which is incorporated herein by reference in its entirety.

FIELD OF THE INVENTION

The present invention relates generally to electrical boxes, and more particularly, to gangable electrical outlet boxes where the components may be ganged together in a snap-fit manner.

BACKGROUND OF THE INVENTION

Electrical boxes are commonly used to accommodate and protect various electrical components such as electrical outlets, switches and other accessories. Quite often, these boxes must be provided in differing sizes to accommodate the number and size of such components. The need for multiple sizes of electrical boxes increases the cost of an electrical installation in that different size boxes must be manufactured and inventoried to meet the desired needs.

SUMMARY OF THE INVENTION

A gangable electrical box includes a U-shaped box member having a generally rectangular back wall including opposed back wall ends. An end wall extends from each of the back wall ends. Each of the end walls has opposed longitudinal edges. The gangable box further includes a pair of generally rectangular side walls where each side wall has opposed side wall ends. The side wall ends are attachable to the U-shaped box member to define an open ended box interior. The longitudinal edges of the end walls and the opposite ends of the side walls include interfitting snap fit connection for toolless attachment of the side walls to the box member.

BRIEF DESCRIPTION OF THE DRAWINGS

FIGS. 7, 8 and 9 show a further embodiment of the electrical box assembly of the present invention.

DETAILED DESCRIPTION OF THE PREFERRED EMBODIMENTS

Figure 1:
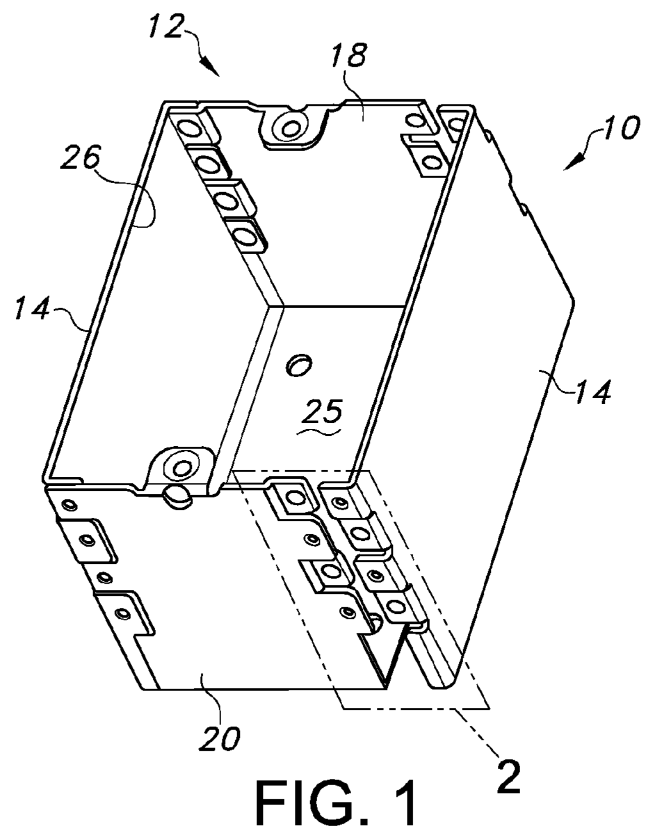
FIG. 1 is a perspective showing of the gangable electrical box assembly of the present invention.

Referring to FIGS. 1-4, the gangable electrical box assembly 10 of the present invention is shown. Box assembly 10 may formed from multiples of two components, one or more U-shaped box members 12 and a pair of side walls 14. In the preferred embodiments shown hereinbelow, the components of the box assembly are metallic.

The U-shaped box member 12 has a generally rectangular back wall 16 having opposed upper and lower back wall ends 16*a* and 16*b*. A pair generally rectangular end walls 18 and 20 extend from the back wall 16 at the opposed ends 16*a* and 16*b*. Each of end walls 18 and 20 have opposed longitudinal edges 18*a*, 18*b* and 20*a*, 20*b* which will be described in further detail hereinbelow.

The distal transverse extents of end walls 18 and 20 include inwardly directed tabs 22 and 24 having mounting apertures 22*a*, 24*a* therethrough. As is well known in the electrical box art these tabs may be used to secure devices such as switches and receptacles thereto.

The gangable electrical box assembly 10 of the present invention further includes a side wall 14 which is also of generally rectangular configuration having opposed side wall ends 14*a* and 14*b* at the opposed longitudinal ends thereof. A pair of such side walls 14 are mountable to the U-shaped box member 12 as shown in FIG. 1 to define a generally enclosed electrical box having a box interior 25 and an open front face 26.

The present invention provides for the formation of a gangable box assembly by snapping the side walls 14 onto the U-shaped box member 12 without use of tools or securement hardware. This provides significant advantages in that a box of various configurations and sizes may be formed from multiples of two components, namely, the U-shaped box member 12 and side wall 14. In this manner, an installer does not have to inventory boxes of different configurations and can form a box of a desired configuration on site. This is all accomplished without the use of tools and securement hardware which would otherwise make such formation time consuming and costly. Toolless connection of side walls 14 to U-shaped box member may be provided by the use of interfitting snap components formed on the U-shaped box member 12 and side wall 14.

Referring to the U-shaped box member 12, each of the longitudinal edges 18*a*, 18*b* and 20*a*, 20*b* of end walls 18 and 20 includes an interdigitating snap connector 30. The interdigitating snap connector 30 is formed of a series of alternating upper and lower flanges 32. The flanges are arranged in successive vertically spaced planes. Similarly, side wall 14 includes, along its ends 14*a*, 14*b*, a similarly constructed interdigitating snap connection 30. The snap connector 30 of side wall 14 also includes an extent of vertically spaced apart flanges 32 therealong. The flanges of the U-shaped box member 12 and the side wall 14 are arranged such that the side wall may be snapped onto the U-shaped box member 12.

Figure 2:
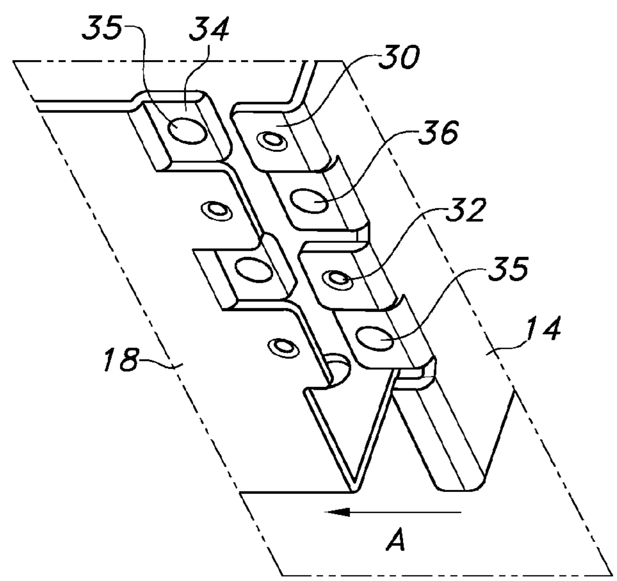
FIG. 2 is a detailed perspective view of the snap fit connection of the box assembly of the present invention.

As particularly shown in FIGS. 1 and 2, the arrangement of the vertically spaced flanges 32 allow the flanges 32 of side wall 14 to interdigitate with the flanges 32 of U-shaped box member 12. Such interdigitation is facilitated by the vertical displacement of the successive flanges along the length of the longitudinal edges of the end walls 18, 20 and the opposite ends of the side walls 14. The arrangement and location of the interdigitating snap connector 30 as well as the arrangement of the flanges 32 are such that a single side wall may be used on both sides of U-shaped box member 12.

Figures 3, 4:
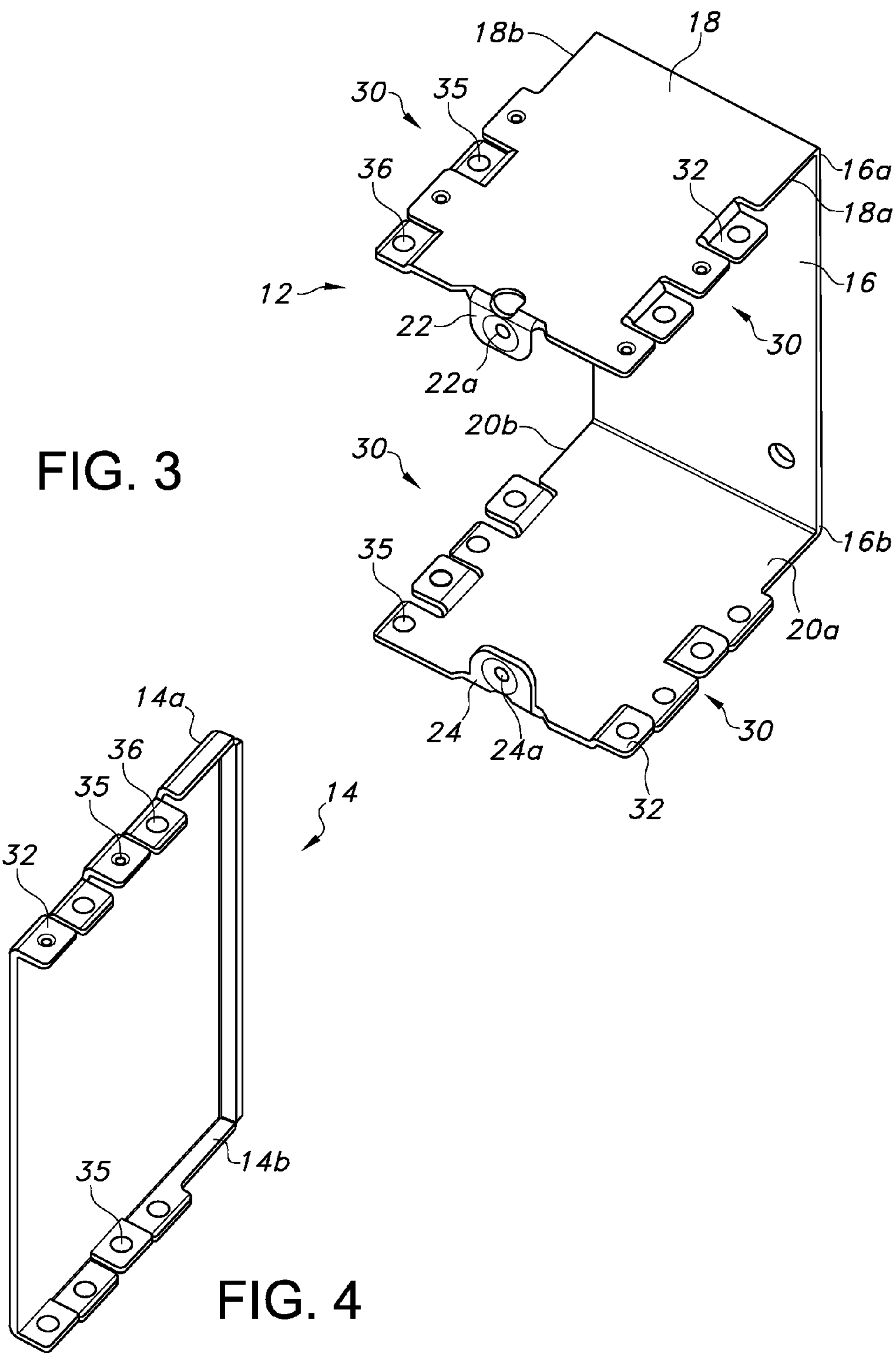
FIGS. 3 and 4 are perspective showings of the components of the electrical box assembly of FIG. 1.

Referring to FIGS. 3 and 4, side wall 14 may be snapped onto U-shaped box member 12 on the left hand side as shown in FIG. 3. An identically formed side wall 14, which is inverted from the position shown in FIG. 4, may be attached to the opposite side of U-shaped box member 12. Thus, a single-gang box assembly 10 of the present invention is formed by use of one U-shaped box member 12 and a pair of identically formed side walls 14. As shown in FIGS. 1 and 2, the side walls 14 are snap connected to the U-shaped box member by lateral movement of the side walls towards the interior of U-shaped box member 12, an example of which is shown in arrow A of FIG. 2.

Figure 5:
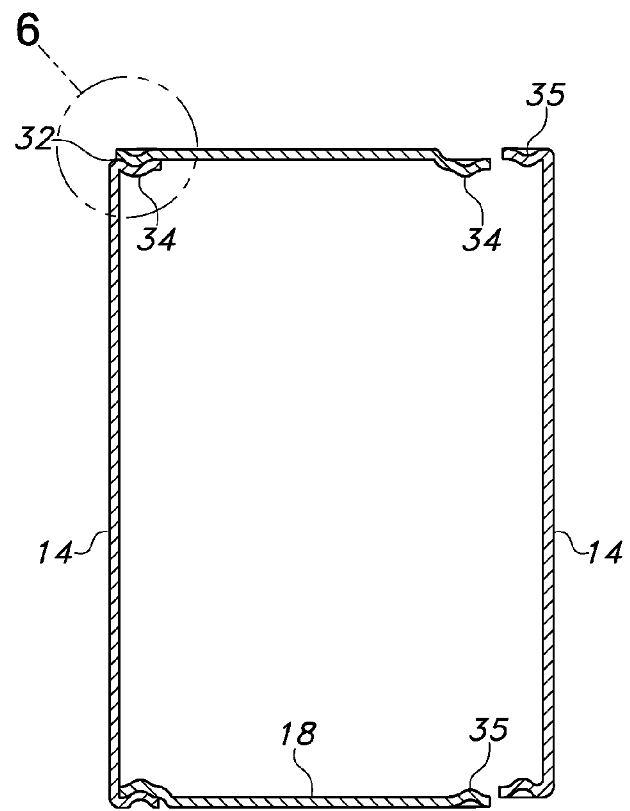
FIGS. 5 and 6 are sectional showings of the electrical box assembly of the present invention.
Figure 6:
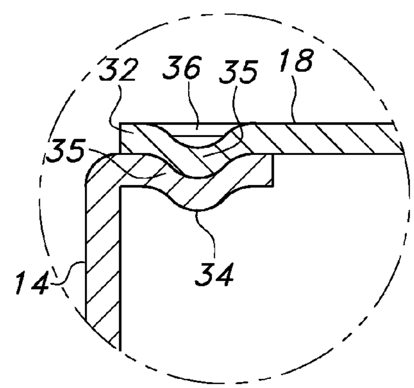

With additional reference to FIGS. 5 and 6, the toolless snap connection of side wall 14 to U-shaped box member 18 is achieved by the use of dimples 35 formed on each of the individual flanges 32. Each dimple 35 includes a recess 36 on one planar surface of flange 32 and a protrusion 34 formed on the opposed surface of each flange 32.

As can be more clearly seen in FIGS. 5 and 6, the protrusion 34 of each flange seats within the recess 36 of its mating flange so as to snap connect the interdigitated connector 30.

The dimples 35 shown in FIGS. 1-6 allow for the snap fit connection of the side wall 14 to the U-shaped box member 12. The dimples provide for maintaining the side wall in its snap fit connection with respect to the U-shaped box member 12. However, as needed, the side wall may be removed from the U-shaped box member so as to reconfigure the gangable electrical box assembly. Such removal is permitted by moving the side wall in a lateral direction opposite arrow A shown in FIG. 2. The dimples 35 are generally circular configurations so that movement of the side wall with respect to the U-shaped box member is achievable in both the direction of arrow A and in the direction opposite of arrow A.

Referring now to FIGS. 7-9, a different configuration of the dimples is provided. FIGS. 7-9 show a configuration of a locking dimple 37, which while similar to dimple 35 described above, is generally of a semi-circular or half-moon configuration. The dimple provides a circular portion and a truncated transverse portion. This arrangement allows the side wall 14 to be snap connected to the U-shaped box member in the direction of arrow A (FIG. 7), but prevents removal of the side wall therefrom thereby locking the side wall to the U-shaped box member. The half-moon or semi-circular configuration of dimple 37 prevents the disconnection of the flanges once snap connection is made. This is particularly shown in FIGS. 8 and 9 herein.

Figure 10:
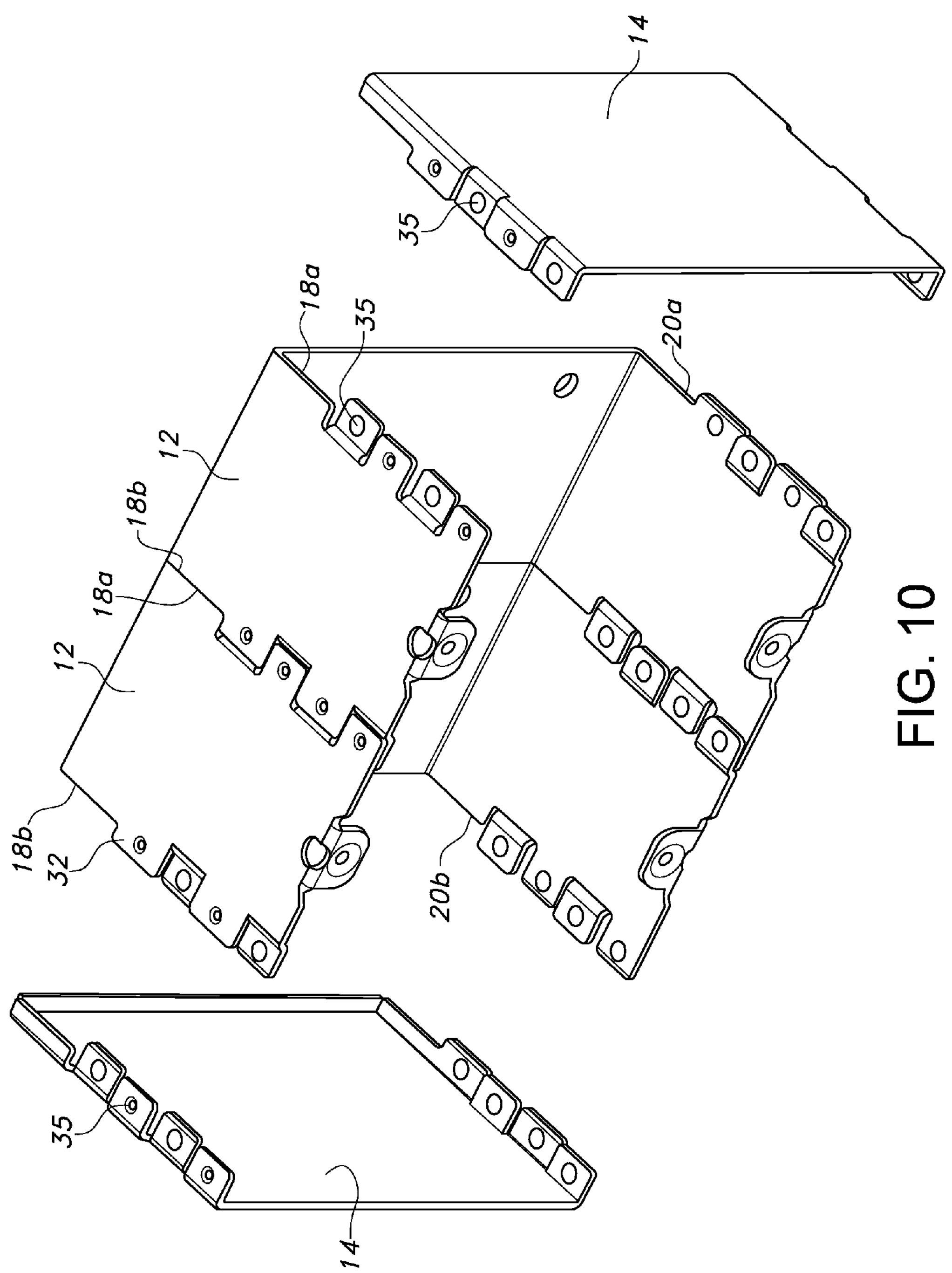
FIG. 10 is a perspective showing of a dual gang box assembly of the present invention.

Referring now to FIG. 10, the ability to construct different size ganged box assemblies from the components of the present invention may be described. In the present illustrative embodiment, a double gang box is shown being constructed. It may be appreciated that the concepts of the present invention may be used to further expand the configuration to include not just a double gang box, but also a triple gang box and potentially boxes of further successive configurations.

The double gang box assembly of FIG. 10 is constructed using two U-shaped box members 12 and a pair of side walls 14. The two U-shaped box members may be ganged together and connected in fashion which is similar to that of the connection of the side wall 14 to the U-shaped box member 12 described above. The interdigitating snap connector 30 formed along the longitudinal edges 18*a*, 18*b* and 20*a*, 20*b* of U-shaped box member 12 permit the two box members 12 to be ganged together using the series of alternating upper and lower flanges 32. The U-shaped box members 12 may be ganged together by toolless snap fit connection of the interdigitated connector 30. The snap fit connection may be a removable connector by employing circular dimples 35 shown in FIG. 10 or may be a locking snap fit connection using the half-moon or semi-circular dimples 37 of FIGS. 7-9.

Once the U-shaped box members 12 (which may two or more) are ganged together, the side walls 14 may be snap connected to the ganged assembly in a manner described above.

Thus, the present invention provides the ability to construct multiple configurations of outlet boxes by ganging together one or more U-shaped box members and a pair of side walls in toolless snap fit connection.

Various changes to the foregoing described and shown structures would now be evident to those skilled in the art. Accordingly, the particularly disclosed scope of the invention is set forth in the following claims.

What is claimed is:

1. A gangable electrical box comprising:

a U-shaped box member having a generally rectangular back wall including opposed back wall ends and end walls extending from said each of said back wall ends, each of said end walls having opposed longitudinal edges;

a pair of generally rectangular side walls, each side wall having opposed side wall ends, said side walls being attachable to said U-shaped box member to define an open ended box interior;

said longitudinal edges of said end walls and said opposed side wall ends of said side walls including an interfitting snap connector for toolless attachment of said side walls to said box member;

wherein interfitting snap components include a plurality of flanges extending along the longitudinal edges of said end wall and said opposed side wall ends; said flanges are arranged in alternately spaced apart parallel planes; said flanges of said end wall are engageable with the flanges of said opposed side wall ends, said flanges of one of said end walls and said opposed side wall ends interdigitate; and said flanges include identically formed dimples each dimple defining both a recess and an opposed protrusion, the recesses and protrusions of the dimples on the interfitting snap connector provide said snap fit.

2. A gangable electrical box of claim 1 wherein said attachment of said side walls to said box member is removable.

3. A gangable electrical box of claim 1 wherein said dimples are generally round.

4. A gangable electrical box of claim 1 wherein said flange including locking elements defining a locking projection and an opposed locking receptacle, the projection and receptacle of the interdigitating flanges form a one-way locking snap fit.

5. A gangable electrical box of claim 1 wherein said U-shaped box member is attached to an identically formed additional U-shaped box member.

6. A gangable electrical box of claim 1 wherein said dimples are generally semi-circular.

* * * * *